May 4, 1965  V. J. BURNELLI  3,181,820
RETRACTILE TAIL

Filed Feb. 17, 1964  2 Sheets-Sheet 1

INVENTOR.
Vincent J. Burnelli
BY
Peck & Peck
ATTORNEYS

May 4, 1965
V. J. BURNELLI
3,181,820
RETRACTILE TAIL
Filed Feb. 17, 1964
2 Sheets-Sheet 2
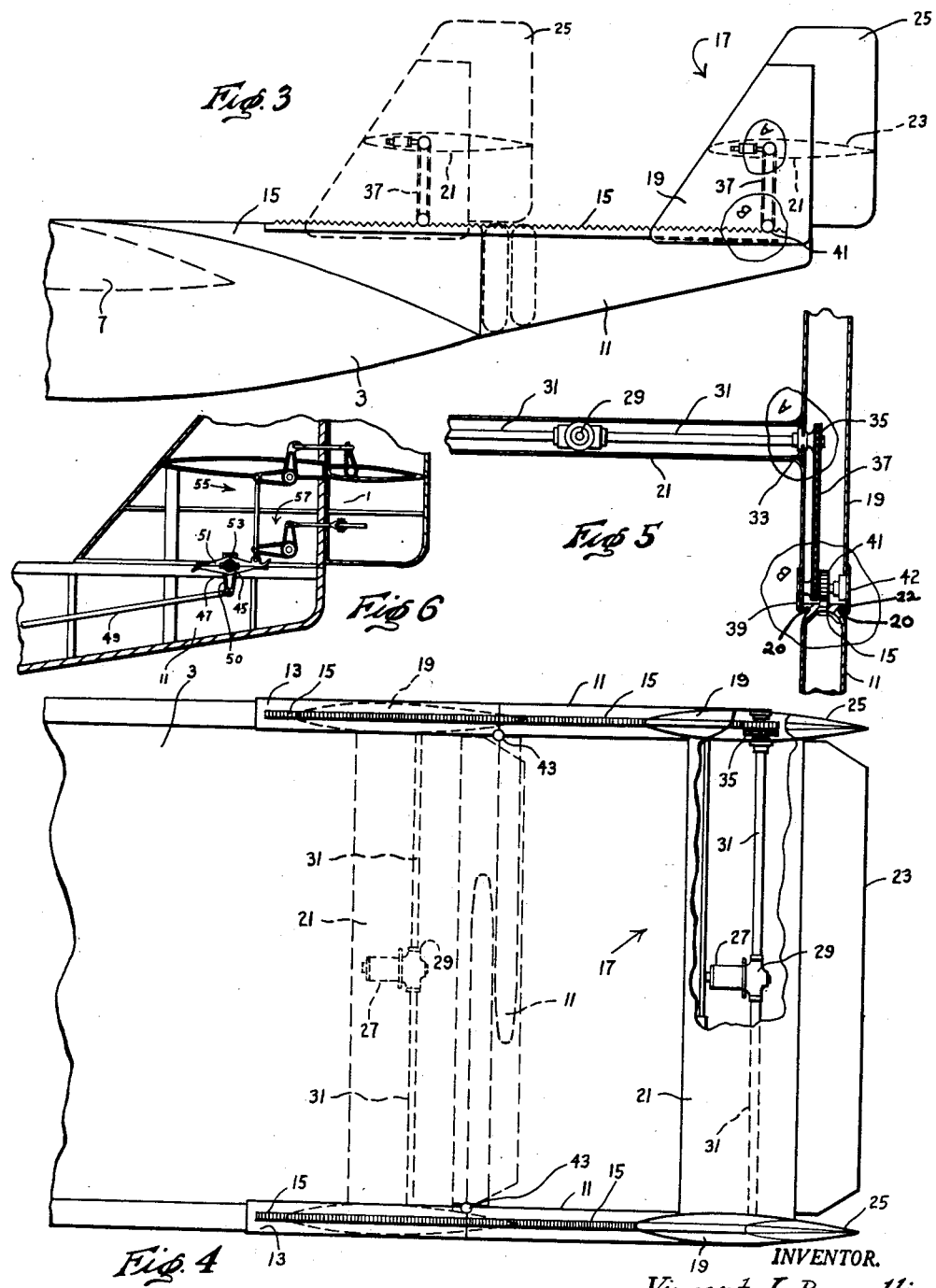
INVENTOR.
Vincent J. Burnelli
BY
Peck & Peck
ATTORNEYS

United States Patent Office 3,181,820
Patented May 4, 1965

3,181,820
RETRACTILE TAIL
Vincent Justus Burnelli, 9250 Piney Branch Road, Silver Spring, Md.; Hazel G. Burnelli, executrix of said Vincent Justus Burnelli, deceased
Filed Feb. 17, 1964, Ser. No. 345,496
9 Claims. (Cl. 244—87)

This invention relates broadly to the art of retractile tails for aircraft, and in its more specific aspects it relates to an airplane of the Burnelli Lifting Body design and provides means for the reduction in longitudinal dimensions of the aircraft; and the nature and objects of the invention will be readily recognized and understood by those skilled in the art to which it relates in the light of the following explanation and detailed description of the accompanying drawings illustrating what I at present believe to be the preferred embodiment or mechanical expressions of my invention from among various other forms, arrangements, combinations and constructions, of which the invention is capable within the spirit and scope thereof.

My invention is especially concerned with airplanes involving the Burnelli Lifting Body design and the reduction in the longitudinal dimension thereof for hanger storage thereof to meet space requirements, and particularly for below deck length reduction. It is necessary in aircraft carrier service and also for large cargo supply aircraft to provide for reduction of length within the requirement for elevator dimensions for below deck storage.

It is conventional practice to provide aircraft with folding wings, and I have devised a means for the reduction of the longitudinal dimension of the aircraft which, along with the folding wings, provides for an overall dimensional reduction of the airplane on the order of 30%. Such a dimensional reduction provides an airplane which is highly suitable for aircraft carrier service when space is of the greatest significance.

In the consideration of the reduction of the longitudinal dimension of airplanes of the type in which I am particularly interested it should be recognized that the problem persists and is currently active, since the tailless designs of aircraft for carrier space reduction have not proven satisfactory for naval combat service.

The means which I have provided for tail retraction are of a relatively simple nature and are not difficult or expensive to install and have few operating parts which need maintenance.

While the drawings illustrate a cargo design with engines and propeller extensions forward, with jet powered combat designs these forward extensions would be eliminated and the percent of reduction of length for below deck storage substantially increased. It must be realized that the number of combat aircraft naval carrier can serve to base determines the extent of combat effectiveness of these marine airdromes.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 3 is a fragmentary view in side elevation of the retractile empennage group, the group being shown in dotted lines in retracted position.

FIG. 4 is a fragmenatry view in top plan of the retractile empennage group, the group being shown in dotted lines in retracted position, and the pair of booms being shown in dotted lines in their folded position.

FIG. 5 is a view showing the operating mechanism operable to cause retraction and extension.

FIG. 6 is a detailed view showing the mechanism whereby rudder and elevator controls and drives are disconnected when the booms are in folded position.

Figure 1:
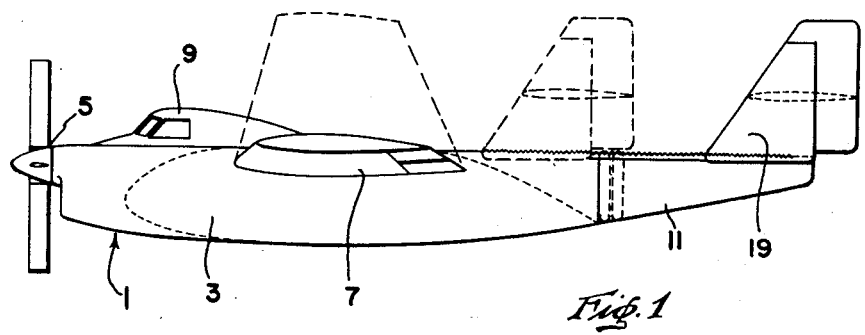
FIG. 1 is a view in side elevation of an airplane of the Burnelli Lifting Body design with the retractile empennage group, the empennage group being shown in retracted position in dotted lines.
Figure 2:
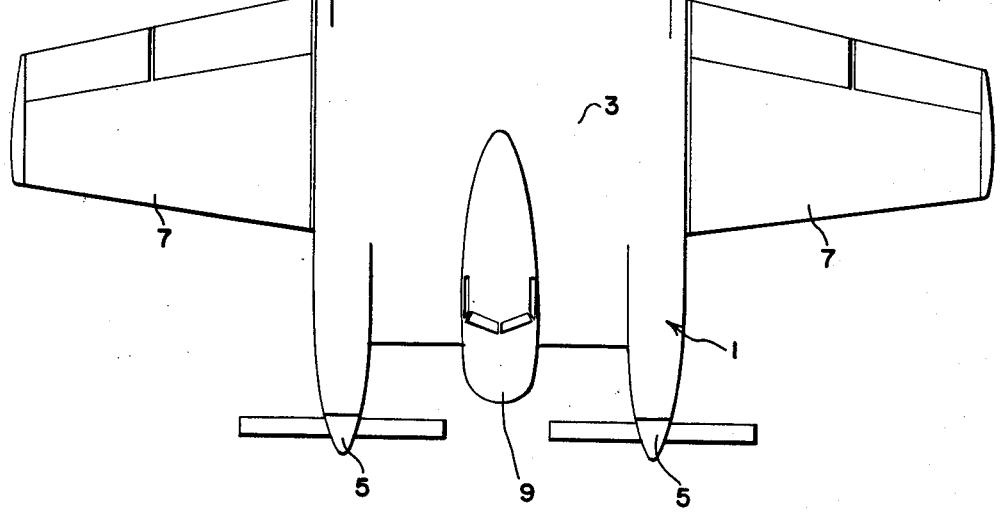
FIG. 2 is a top plan view of the airplane illustrated in FIG. 1.

In the accompanying drawings I have used the numeral 1 to designate the airplane of the Burnelli Lifting Body type in its entirety, this airplane being formed with a wide body section 3, power means 5 of any suitable type, wings 7 and a pilot or cargo compartment 9.

Mounted in and extending rearwardly from each side of the wide body section 3 are a pair of booms 11, the roots 13 of such booms being fixed to the wide body section 3 of the airplane. Fixed in any suitable manner on the top surface of each boom 11, and also on the top surfaces of the root portions 13 thereof, is a rack 15, the purpose of which will be hereinafter described.

I have used the numeral 17 to designate the retractile empennage group in its entirety, such group being composed of vertical fins 19, one being slidably mounted on each boom of the pair of booms, a cross member 21 fixed to and extending between the vertical fins, an elevator 23 pivotally associated with the trailing edge of the cross member, and a rudder 25 pivotally associated with each fin.

Each vertical fin 19 is mounted on a boom in any suitable manner for sliding movement with respect thereto. In FIG. 5 of the drawings I have shown one example of how the fins may be slidably mounted on the booms. On each side of a vertical fin I provide an inwardly extending flange 20, and on the top of each boom I provide a pair of flanges 22 which extend in opposite directions from the boom. As will be apparent the flanges 20 slidably extend under the lateral flanges 22, to provide a trackway for the vertical fins and the empennage group.

Preferably mounted within the cross member 21 is a reversible electric motor 27, the operation of which is controlled in any suitable manner from the pilot's compartment of the airplane, such electric motor having its shaft connected with a conventional reduction gear means 29 which operates a pair of oppositely extending shafts 31 which extend therefrom, one shaft extending to and into and being rotatively mounted in one vertical fin, and the other shaft extending to and into and being operatively mounted in the other vertical fin of the retractile empennage group of the airplane. The operative mounting of said shafts being shown at 33 (FIG. 5). Mounted on the outer end of each shaft 31 for rotation therewith is a sprocket 35 which drives a chain 37 which extends downwardly within each vertical fin and extends about a further sprocket 39 which is journaled in a wall of the vertical fin and is fixed to a gear 41 which in turn is journaled in the opposite wall of the vertical fin as at 42. It will now be understood that the gear 41 will be caused to rotate when the sprocket 39 is caused to rotate by the chain. The gear 41 is seated in and arranged for travel in the gear rack 15 which is mounted on the top of each boom. It will be appreciated that the structure just described, that is, the two sprockets and the gear are provided in each vertical fin, thus when the gears are caused to rotate each vertical fin will be caused to travel along its associated boom.

Each boom 11 is hinged as at 43, and I may use any suitable hinge means, for instance, if desired, I may use a conventional piano hinge.

When it is desired to shorten the longitudinal dimension of the airplane the electric motor is operated in a direction to cause the shafts 31 to rotate in a counterclockwise direction. Rotation of the shafts causes rotation of the sprockets 25, the chains 37 and the gears 41 so that the empennage group 17 is caused to travel forwardly along the gear racks 15 on the booms 11.

When the empennage group is in fully retracted position as illustrated in dotted lines, the booms are swung or folded inwardly on the hinges 43 into the position illustrated in dotted lines in FIG. 4. When it is desired to project the empennage group into operative position, the motor 27 is reversed with a corresponding reversal of the various operating elements so that the group will travel along the gear racks to fully projected operative position.

In FIG. 6 of the drawings I have illustrated a mechanism for connecting and disconnecting the controls for the tail group of the airplane.

Pivotally mounted on each boom 11, as at 45, is a tiller segment 47 which is caused to rock upon actuation of a control shaft 49 from the pilot's cabin, the shaft 49 being connected to a tiller arm 50. Mating with this tiller segment 47 is a further tiller segment 51 which is pivotally mounted as at 53 on each vertical fin 19, any suitable operating means such as the linkages 55 and 57 are operated by rocking movement of the segment 51 to similarly operate the elevator and rudder of the tail group. It will now be appreciated that when the empennage group 17 is in projected operative position the tiller segments will be mated and co-active as shown, so that rocking of segment 47 will cause rocking of segment 51 to engage the control drives for the elevator and rudder. When the empennage group is retracted, as explained above, the segment 51 will slide off the segment 47 to make such controls inactive.

I claim:

1. An airplane including, in combination, a wide airfoil body section having a pair of booms extending rearwardly from opposite sides thereof, a vertical fin slidably mounted on each boom, a horizontal and vertical tail group assembly mounted on and extending between said vertical fins and movable therewith, drive means connected with said vertical fins and said booms and operable to move said fins and said tail group assembly to retracted position and to operative projected position, and said pair of booms being movable out of normal operative position into position reducing the length of the airplane when the fins and tail group assembly are in retracted position.

2. An airplane in accordance with claim 1, wherein each of said booms is provided with hinge means, and said booms extend inwardly in side by side relation when moved out of normal operative position.

3. An airplane including, in combination, a wide airfoil body section having a pair of booms extending rearwardly from opposite sides thereof, each of said booms including a root portion fixed to said body section and a portion extending rearwardly therefrom, a vertical fin slidably mounted on each boom, a horizontal and vertical tail group assembly mounted on and extending between said vertical fins and movable therewith, drive means connected with said vertical fins and said booms and operable to move said fins and said tail group assembly to retracted position on said root portions and to operative projected position on to said rearwardly extending portion, and each of said booms having singe means provided thereon at the rear end of the root portion, the rearwardly extending portions of the booms being movable on said hinge means out of normal operative position into position reducing the length of the airplane when the fins and tail group assembly are in retracted position.

4. An airplane in accordance with claim 3, wherein said rearwardly extending portions of the booms extend inwardly in side by side relations when moved out of normal operative position.

5. An airplane including, in combination, a wide airfoil body section having a pair of booms extending rearwardly from opposite sides thereof, a vertical fin slidably mounted on each boom, a horizontal and vertical tail group assembly mounted on and extending between said vertical fins and movable therewith, a motor mounted on said tail group assembly, means in each fin connected with said motor and operated thereby, further means on each boom co-active with said means in each fin to cause travel of said fins and tail group assembly on said booms when said motor is operated to retract or project said fins and tail group assembly, and said pair of booms being movable out of normal operative position into position reducing the length of the airplane when the fins and tail group assembly are in retracted position.

6. An airplane in accordance with claim 5, wherein said means in each fin comprises an upper sprocket and a lower sprocket, and said upper sprocket is connected to said motor and caused to rotate when said motor is operated, a chain connecting said two sprockets for rotation of said lower sprocket when said upper sprocket is rotated, and said lower sprocket being in operative contact with said further means on each boom.

7. An airplane in accordance with claim 5, wherein said further means comprises a gear rack.

8. An airplane in accordance with claim 5, wherein said means in each fin comprises an upper sprocket and a lower sprocket, and said upper sprocket is connected to said motor and caused to rotate when said motor is operated, a chain connecing said two sprockets for rotation of said lower sprocket when said upper sprocket is rotated, and said further means comprises a gear rack and said lower sprocket is in operative engagement with said gear rack.

9. An airplane in accordance with claim 5, wherein said means in each fin comprises a pair of sprockets, a chain connecting said sprockets in driven and driving relationship, one of said sprockets being connected to said motor for operation thereby and the other sprocket being in operative contact with said further means on each boom.

No references cited.

MILTON BUCHLER, *Primary Examiner.*